UNITED STATES PATENT OFFICE.

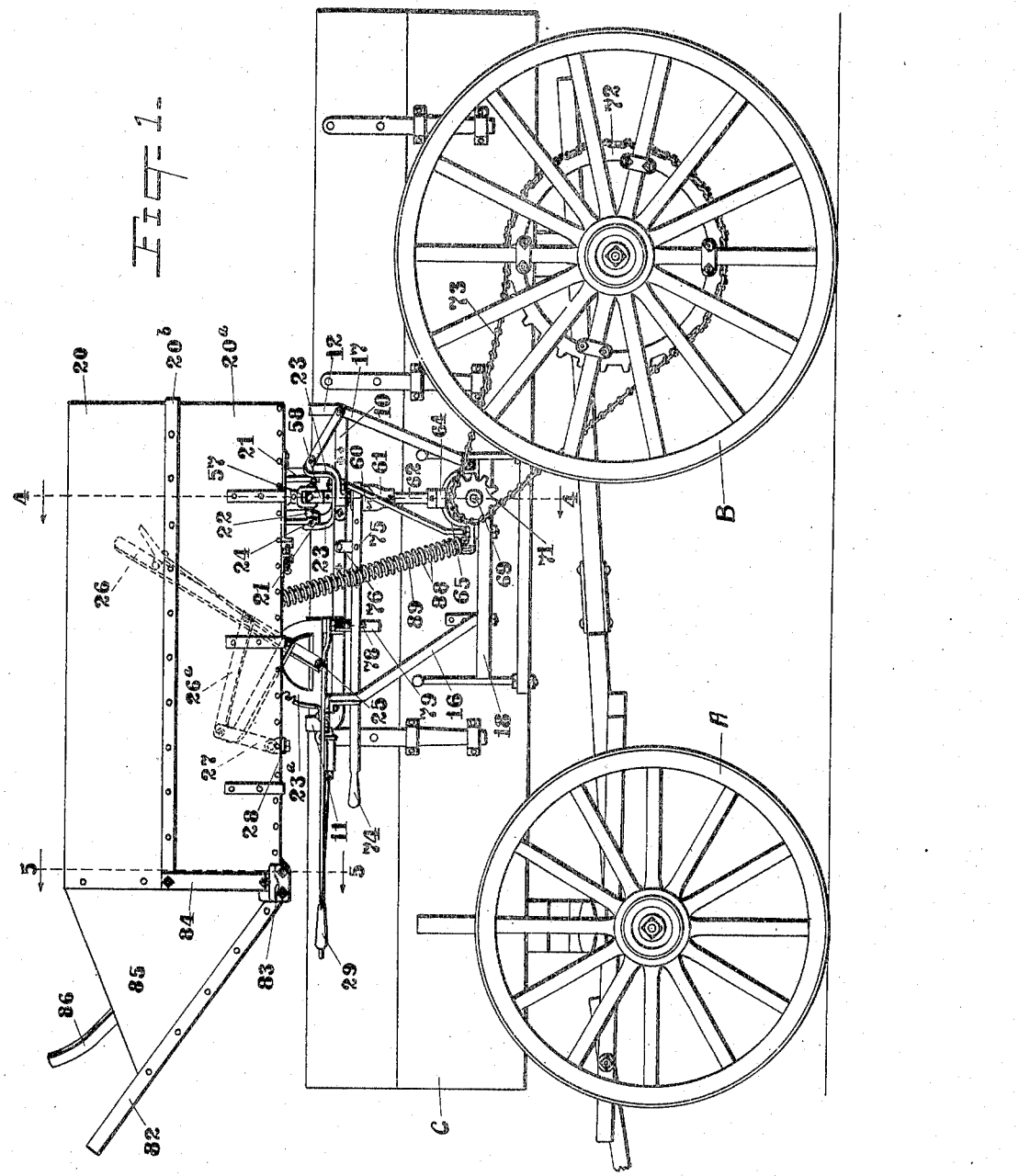

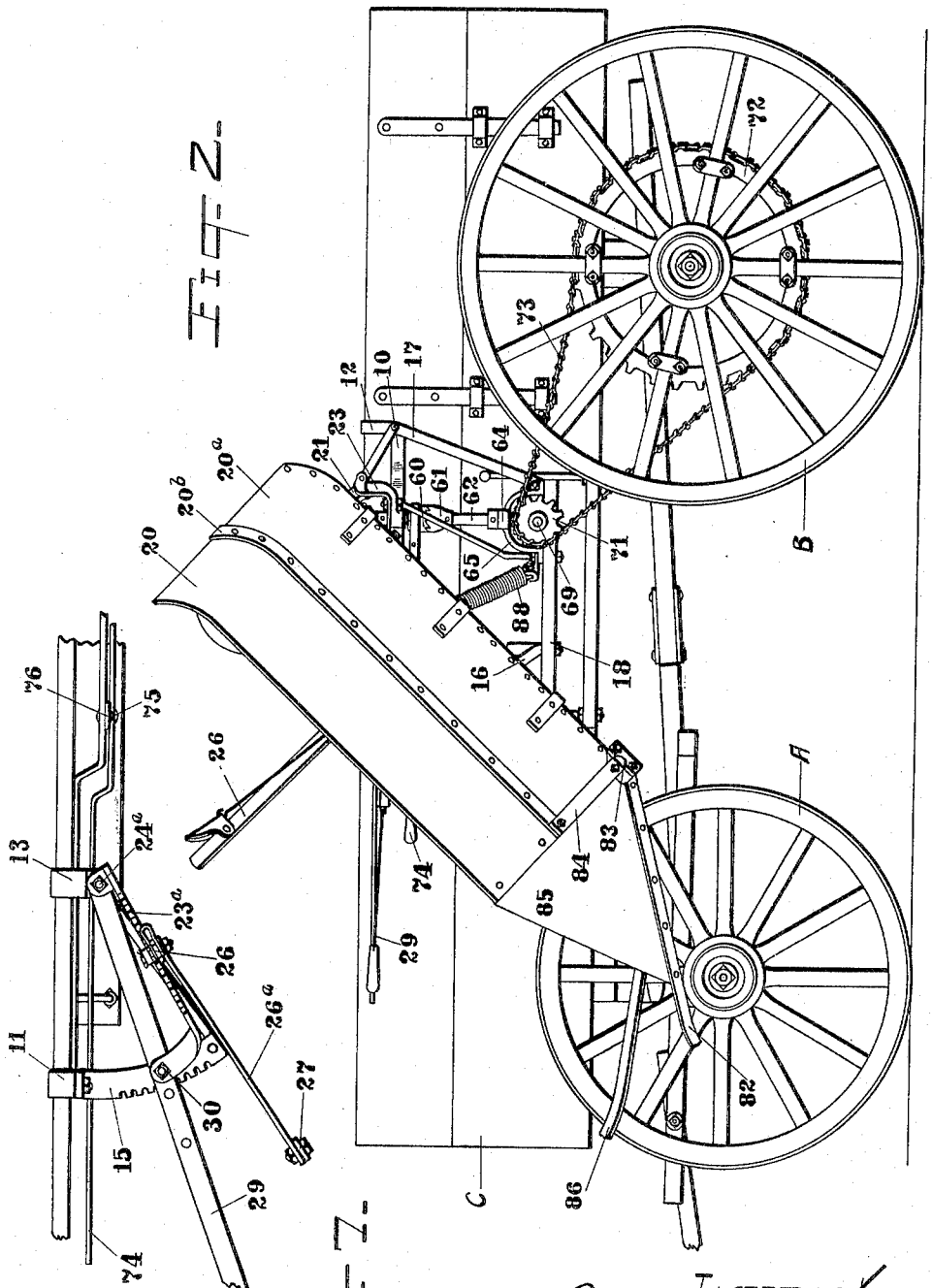

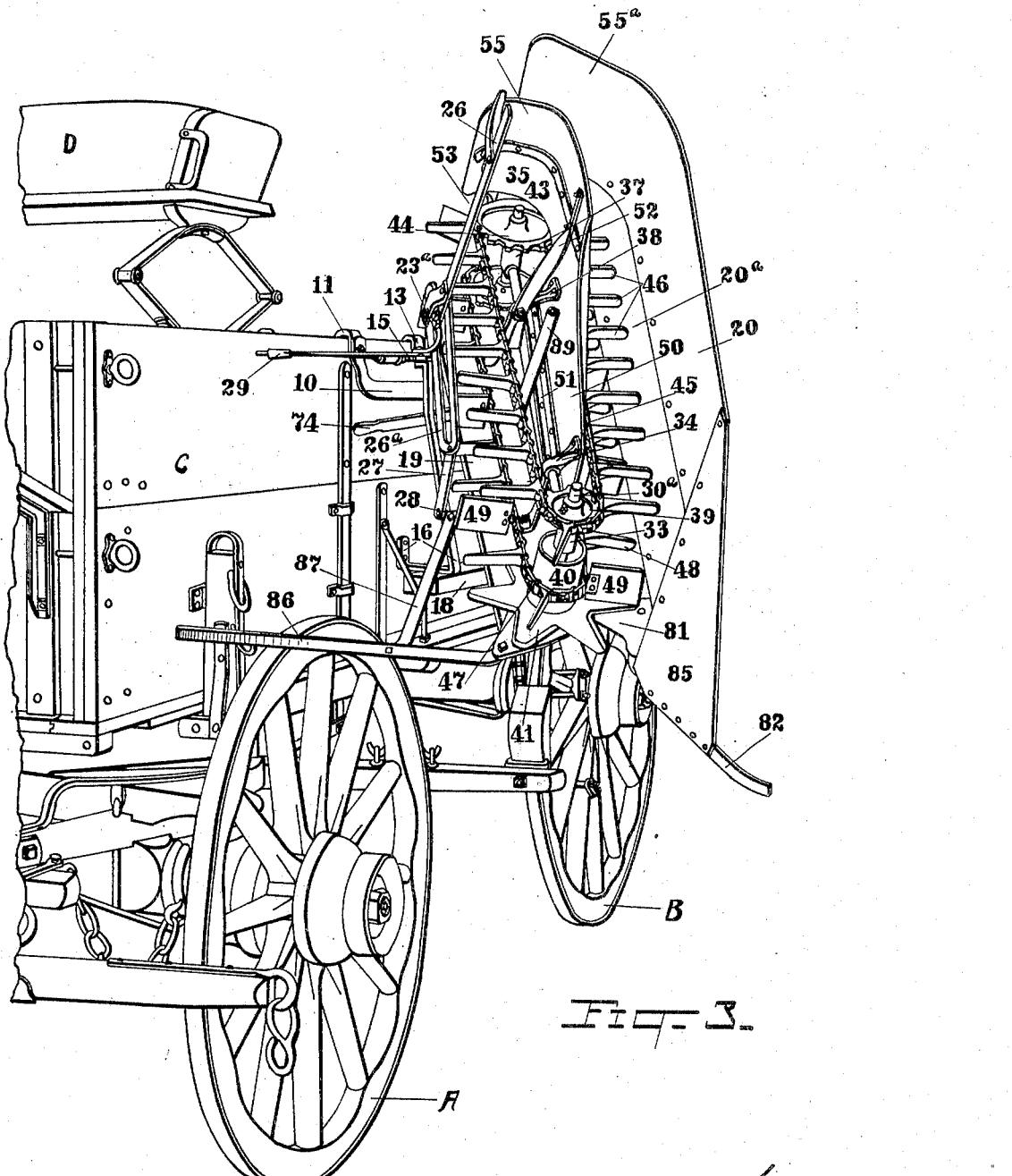

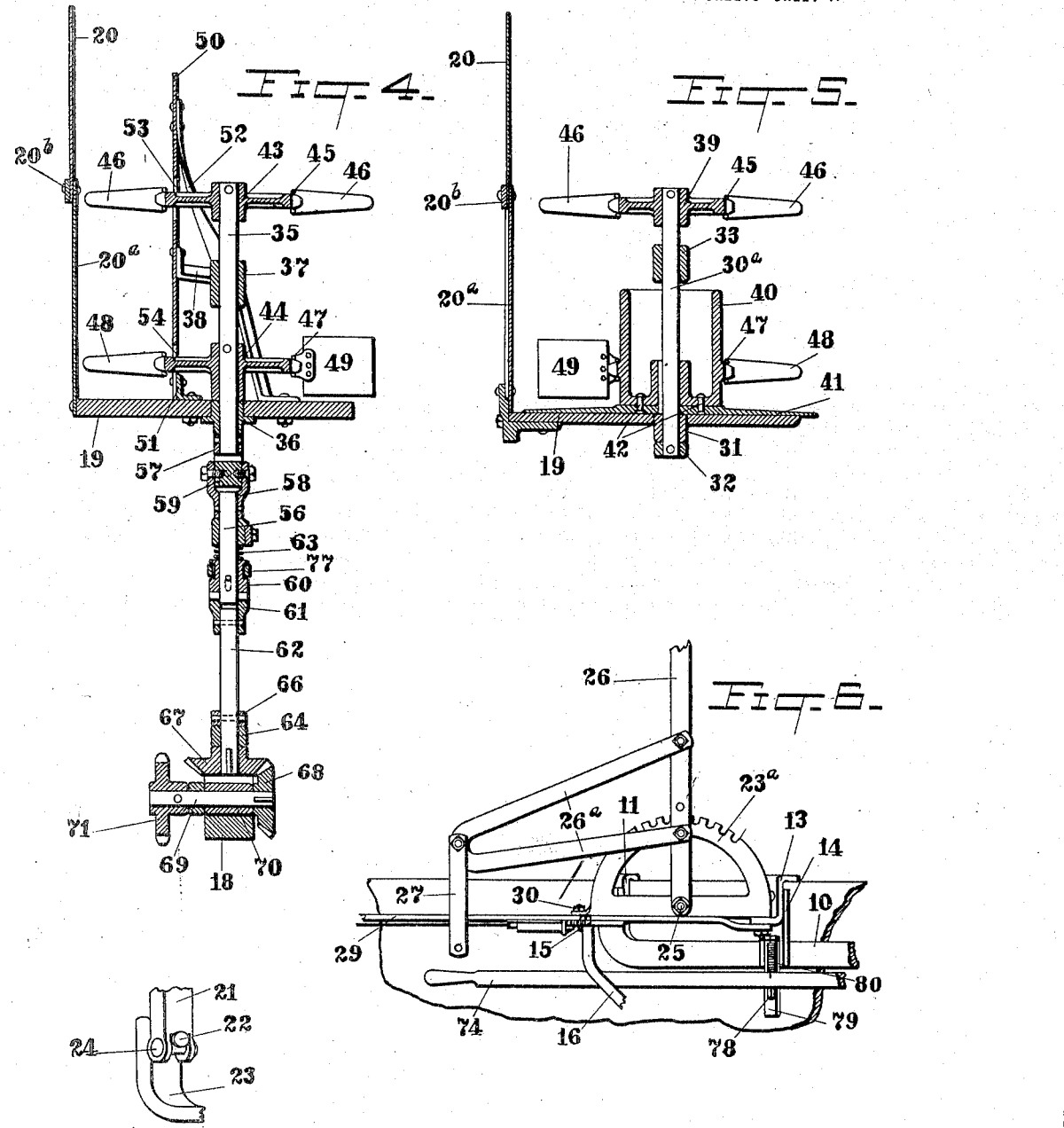

ROBERT R. BOWERS, OF OTTUMWA, IOWA, ASSIGNOR TO DAIN MANUFACTURING COMPANY OF IOWA, OF OTTUMWA, IOWA, A CORPORATION OF IOWA.

KAFIR-CORN HEADER.

1,321,805.  Specification of Letters Patent.  Patented Nov. 18, 1919.

Application filed August 12, 1918. Serial No. 249,564.

*To all whom it may concern:*

Be it known that I, ROBERT R. BOWERS, a citizen of the United States, and a resident of Ottumwa, in the county of Wapello and State of Iowa, have invented certain new and useful Improvements in Kafir-Corn Headers, of which the following is a specification, reference being had to the accompanying drawings.

This invention relates to improvements in means for harvesting Kafir-corn or other crops where it is customary to sever and gather the heads from the standing stalks. More particularly it relates to that type or style of mechanism that can be readily applied to and used in connection with an ordinary farm wagon into which the garnered grain is automatically dumped, the power for actuating such mechanism being derived from one of the wheels or axles of the wagon. The leading object of the invention is to provide an apparatus of this general character comprising a combined cutting and conveying mechanism that can be very readily attached to an ordinary wagon box or body and that when so attached can be easily and quickly manipulated by the driver to raise or depress its forward end and that can also be moved laterally closer to or farther from the wagon body, such up and down and lateral movements permitting the harvesting or cutting of all the grain notwithstanding that the variation in the height of the stalks in the same plant row is very considerable and also that the rows may vary to quite an extent from a straight line or the heads to be gathered may be hanging over at one side or the other. In addition to providing means that permit the ready and easy manipulation of the apparatus as a whole, as above briefly described, it is further my object by this invention to provide improved means for severing the heads of the stalks, to provide an improved conveyer that will act upon the severed heads to cause them to be promptly moved to a point over the wagon body and deposited therein; and to improve generally the construction and operation of harvesting apparatus of the general type mentioned. These objects I accomplish by the devices and combinations of devices shown in the drawings and hereinafter described, and those things which I believe to be new will be pointed out in the claims.

In the drawings:—

Figure 1 is a side elevation of an ordinary farm wagon with my improved mechanism connected thereto, the grain cutting and conveying mechanism being in the highest position to which it can be adjusted,— the lever means that in part supports the conveyer and through which the adjustment of said mechanism is effected being shown in broken lines;

Fig. 2 is a view similar to Fig. 1 but showing the cutting and conveying mechanism depressed so that its forward end is in substantially its lowermost position;

Fig. 3 is a perspective view showing a portion only of the wagon to which the apparatus is secured, and showing such apparatus in substantially the position represented in Fig. 2;

Figs. 4 and 5 are vertical sections taken on the lines 4—4 and 5—5, respectively, of Fig. 1;

Fig. 6 is a detail of the means employed for effecting changes in the position of the conveyer;

Fig. 7 is a detail being a top or plan view of the parts represented in Fig. 6; and Fig. 8 is a detail of a portion of the means by which the rear portion of the conveyer is movably connected with the wagon body near the upper edge of one of the sides of such body.

Referring to the drawings:—A—B indicate the front and rear wheels, respectively, of an ordinary farm wagon, and C the body or box thereof, from the outer face and upper edge of one of the sides of which body my improved mechanism is supported. Such supporting means is in the form of a framework that includes a longitudinally-extending bar 10 whose ends are bent to form hooks 11 and 12 respectively, that engage the upper edge of the side of the wagon body as shown, and further support from such edge is afforded by an intermediate hook 13 to which a bar 14 (see Fig. 6) is connected that at its lower end is secured to the bar 10. Rigidly connected to the forward upturned end of the bar 10 that terminates in the hook member 11 is an outwardly-extending horizontal curved rack arm 15, to the outer end of which is suitably secured the upper end of a brace 16, the lower portion of which is turned in toward the wagon body and then bent vertically (see Fig. 3) to lie against and adapt it to be attached to such body. The rear end of the bar 10 has connected to it a brace 17, the lower portion of which is likewise inwardly and upwardly turned to adapt it to be secured against the side of the wagon body. The bar 10 is bent, as best shown in Fig. 7, so that its rear portion stands at some considerable distance from and parallel to the side of the wagon body, the brace 17 that is connected with the end of such bar serving to maintain it in such position. The inwardly-turned and substantially-horizontal lower portions of these braces 16 and 17 have bolted or otherwise secured to them a bar 18 which acts to support certain of the operating parts as hereinafter described, such bar 18 being held at a sufficient distance from the wagon body for that purpose by reason of the downward and outward inclination of the braces, as clearly exemplified by the showing of the brace 16 in Fig. 3.

The conveyer to which reference has been made comprises a base 19 along which the harvested material is moved, by means herinafter described, and an outer side wall which latter, as shown, is preferably made of an upper section 20, a lower section $20^a$, and a central reënforcing strip $20^b$. Said conveyer is adjustably mounted upon the supporting frame-work that has been described, the means for so mounting and adjusting it being as follows:—To the under face of the base member 19 and a short distance from the rear end thereof are secured two short downwardly-projecting arms 21 spaced a short distance apart and each bifurcated at its lower end (see Fig. 8) to loosely straddle a pivot 22 projecting from an upstanding arm 23 that is fast to the bar 10, each arm 21 being held in engagement with its arm 23, in the construction shown, by a cross-bolt 24 secured beneath the pivot 22. Preferably the two supporting arms 23 will be formed as members of a single yoke-like bracket as shown (see Fig. 1) to facilitate attachment to the bar 10. It is to be noted that the arms 23 of the yoke-like bracket and the downwardly-depending arms 21 which they respectively engage are arranged so that the forward ones of the arms 21—23 are slightly nearer the wagon body than the corresponding rear arms, so that when the conveyer is turned down into operative position, as hereinafter explained, such forward end will tend also to be carried outward. By reason of the loose fit of the members 21 upon their respective pivots 22, however, the conveyer is capable of being controlled with respect to the extent which its front end may so swing laterally; the character of the said connection of the rear portion of the conveyer frame to the bar 10 is therefore in the nature of a universal joint. The conveyer frame is further connected with the bar 10 of the supporting frame at a point forward of the connections just described. This forward connection is preferably made at substantially the longitudinal center of the conveyer frame and is effected through a vertically-disposed segmental rack and lever means connected therewith. The segmental rack is indicated by $23^a$ and, as shown, it is provided at its rear end with a horizontal ear (see Fig. 7) which is pivotally attached at $24^a$ to an outwardly-extending horizontal portion of the central hook 13 that is one of the supports for the bar 10. Pivoted at 25 to a horizontal cross-bar member of the segmental rack is a hand-lever 26 which will be provided with the usual spring latch to engage the rack. Rigidly secured to such hand-lever and projecting forwardly therefrom is an arm $26^a$, which is here shown as a strip bent upon itself and having its ends secured at a short distance from each other to the lever. At the forward end of this arm $26^a$ is pivotally attached the upper end of a link 27 that at its lower end is pivotally connected to a bracket 28 secured to the base portion 19 of the conveyer near the inner edge of such base. By a forward stroke of this lever 26 it is evident that the conveyer can be rocked on its rear pivotal support that comprises the members 21, 22, and 23, the extent of such rocking movement being controlled, of course, by the degree to which the lever is moved. 29 indicates a horizontally-arranged lever pivoted on the same pivot, $24^a$, as the segmental rack $23^a$, and so secured to said segmental rack as to always move therewith. As shown, such connection is made by means of a bolt 30 passed through a laterally turned portion of the rack and through the said lever 29. This lever 29 lies over the fixed curved rack bar 15 that projects laterally from the bar 10, as before described, and will be provided with a usual latch to engage the notches of such rack. As will be understood, the angle at which the conveyer stands out from the wagon body can be regulated through this horizontal lever 29. As will be apparent from Fig. 3, both of the operating hand-levers 26 and 29 are within easy reach of the driver while on his seat D.

Referring now to the cutting and conveying mechanism and the means for actuating the same,—$30^a$ indicates a shaft passing through and standing perpendicular to the base 19 of the conveyer, said shaft being located near the front end of the conveyer; its lower end is journaled in a bearing 31 secured to such base and below such bearing a collar 32 is secured to the shaft to prevent any upward movement of the shaft. Near its upper end the shaft is supported in a bearing 33 that is carried by a bracket or arm 34 (see Fig. 3) that is bolted to a vertical wall or partition that will be hereinafter referred to. 35 indicates another shaft located near the rear end of the conveyer and parallel with the shaft 30ª. It is supported in a lower bearing 36 secured to the base 19 and an upper bearing 37 that is held in place by an arm 38 bolted to the wall or partition mentioned. 39 indicates a sprocket-wheel fixedly secured to the upper end of the shaft 30ª, and 40 indicates a large drum of the same diameter as said sprocket-wheel, the outer face of the drum being provided with an annular row of sprocket-teeth. The hub of the drum is keyed or otherwise secured upon the shaft in such position as to bring its lower end a sufficient distance above the upper surface of the base 19 to accommodate between such base and drum a large star-shaped or multi-armed knife 41, the cutting edges of which are suitably beveled as usual in such a cutting implement. This knife is affixed to the drum 40 so as to rotate therewith, being affixed in place in the construction shown by rivets 42. The knife is of a diameter that brings the ends of its arms nearly to the side wall member of the conveyer.

43 indicates a sprocket-wheel secured at the upper end of the shaft 35, and 44 is a sprocket-wheel secured also to said shaft 35 in position to have its teeth at the same distance above the base 19 as are the teeth on the drum 40. Around the two upper sprockets 39—43 passes an endless link belt 45 to which are secured at intervals laterally-projecting arms 46, and around the sprocket-wheel 44 and the drum 40 passes another similar belt 47 to which is secured another set of arms 48, but in connection with this lower traveling belt there is substituted for every third or fourth arm 48 (see Fig. 3) a wider device 49 whose lower edges approach much nearer the surface of the base 19 than do the arms 48 and are therefore better adapted to engage loose grains or small portions of heads of the material, being operated on and sweep them along on the surface of said base. These devices 49 I term sweeps as distinguished from the narrower arms 48. The arms 46 and 48 of the two endless belts, while aiding in the movement of cut material along the base of the conveyer frame, are designed to so engage the standing grain as to force it into the proper position to be cut by the cutter 41 and a fixed cutting blade with which the cutter 41 coöperates—such fixed blade being more definitely referred to hereinafter.

The partition or wall in the conveyer frame that has been hereinbefore referred to, is a wall that stands at a distance from the side wall of the said conveyer frame, as best seen in Fig. 4. Such partition is indicated by 50 and it may be secured in position by attachment to an angle-iron 51 that is fastened to the base 19 and by one or more braces 52, as shown, or in any other suitable manner. It is located a suitable distance from the outer side wall and provides a passage way at one side of the conveyer frame in which will be kept confined the material that is deposited on the conveyer base 19, as hereinafter described, during the movement of such material from the time of its reception in the conveyer until discharged therefrom. The front end of this partition or dividing wall is best arranged far enough back of a transverse line passing through the axes of the sprocket 39 and drum 40 so that it will not be necessary to notch or slot it to allow such rotating parts to project through, but as its rear end projects well past the rear sprockets 43 and 44, as clearly shown in Fig. 3, it is there provided with two deep notches 53 and 54 to accommodate the sprockets and the devices movable therearound. Such rear end of the partition or dividing wall is curved inward as at 55 and the rear portion of the outer side wall of the conveyer frame is correspondingly curved, as at 55ª,—see Fig. 3. Such inward curving of these parts is of very considerable importance as thereby a passage-way is provided of a character that insures all material passed along it being deposited within the wagon body or box, for it is to be understood that no matter to what position the conveyer as a whole may be adjusted its rear end will always stand in such relation to the wagon body or box that the rear curved end of the said passage-way will project far enough beyond the side of such body or box as to compel a proper discharge therein of all material moved along such passage-way.

Referring now to the means by which power is applied to the movable elements in the conveyer frame,—56 indicates a short vertically-arranged shaft section journaled in the bracket member that comprises the arms 23. The upper end of this short shaft section is connected through the medium of a universal joint with the lower end of the shaft 35. Such universal joint, in the construction shown, comprises two yokes 57 and 58 secured respectively upon the ends of the shafts 35 and 56 and each embracing and being pivotally connected to a block 59. Secured upon the lower end of the shaft section 56, and in such manner as to be movable to a limited extent longitudinally of the shaft, is a clutch member 60 that is normally held in clutching engagement with another clutch member 61 fast on an alined shaft section 6. The means for holding such clutch members in engagement is a coiled spring 63 interposed between said bearing for the shaft 56 and the upper end of the clutch member 60. The lower portion of the shaft 62 is journaled in a bearing 64 formed with and supported by a curved bracket 65 (see Figs. 1 and 2) bolted to the bar 18. A collar 66 pinned or otherwise made fast to the shaft bears against the bearing 64 and supports the shaft. Suitably secured by a key or otherwise to the lower end of the shaft is a bevel gear 67 which meshes with a bevel gear 68 affixed to one end of a short horizontal shaft 69 that is revolubly mounted in a bearing 70 supported by the said bar 18, and to the other end of such horizontal shaft is secured a sprocket wheel 71 over which and over a large sprocket 72 clamped to the adjacent rear wagon wheel B runs an endless sprocket chain 73. With the clutch members 60—61 in engagement—as they normally are—it will be evident that when the wagon is in motion the shaft 35 will be constantly driven and the arms 48 and sweeps 49 be moved to force all material gathered by the conveyer frame and deposited on its base along the passageway that is formed between the side wall 20—20$^a$ and the partition or dividing wall 50 and discharge it, as before described, into the wagon box. When, however, it is desired to stop the operation of the mechanism without stopping the forward movement of the wagon the clutch 60 can be quickly moved out of engagement with the other clutch member 61 through the turning of a shifting lever 74 that is pivoted at 75 to a bracket 76 fastened to the bar 10, the rear end of such lever being forked or bifurcated as usual and pivotally attached to a collar 77 seated in a recess in said clutch member 60. The shifting lever may be locked to hold the clutch members separated by springing it under a lug 78 that is formed on some stationary part, as for example, a brace 79 that connects with the bar 10. A coiled spring 80 holds the shifting lever in locking engagement with such lug when the clutch members are separated and tends to hold such clutch members together when the lever is released from its engagement with such lug.

Acting in connection with the rotating star-shaped cutter or knife 41 for the purpose of severing the heads of the grain from the stalks is a stationary cutter or knife 81 which is secured to the forward end of the base 19 and in line with the passageway that is formed between the outer side wall of the conveyer and the partition wall 50. It is preferably formed with a cutting edge by beveling the underside of the edge portion of the plate, and as the arms of the rotating knife have their cutting edges formed by beveling the upper sides it is evident that the two knives, lying in close engagement with each other, will coöperate in effecting the desired cutting of the stalks, and as the severing of the stalks will ordinarily be done while the conveyer as a whole is held at a considerable angle the cutting of the stalks is, of course, on an angle and consequently more easily accomplished than if they were cut squarely across, as less power is required, and furthermore, so cutting on an angle produces less wear on the knives.

As provision must be made, of course, for properly engaging leaning stalks and directing them toward the cutting means I have provided guarding and guiding devices at each side of the open front end of the conveyer. At the outside there is provided for this purpose a guard member 82 in the form of a bar that projects forwardly and outwardly and will tend to gather any outward leaning stalks and straighten them sufficiently so that they will be engaged by the moving arms 46 and 48 and forced between and severed by the described cutting means. This inclined bar 82 is secured to a casting 83 at the forward end of the conveyer, which casting also serves the purpose of securely joining the side wall of the conveyer frame and its base 19 together, a reinforcing strip 84 being attached at its lower end to this casting and secured at its upper end to the side wall member 20$^b$. The stalks that are acted upon and guided by the said guard 82 are also assisted into proper position for being cut by a shield 85 connected to the forward edge of the side wall of the conveyer frame and to the guard 82, such shield serving also as a brace to hold the guard in position. 86 indicates a guard at the inner side of the conveyer frame. As shown, it consists of a bar that is secured to the forward portion of the conveyer base 19 and extends forwardly therefrom and also toward the wagon body so as to fend leaning stalks away from the adjacent wagon wheel A and properly direct them toward the cutting mechanism. As shown, this guard 86 is braced by a member 87 that connects at its rear end with the bracket 28.

From the foregoing description of the construction and arrangement of the parts, it will be understood that the mechanism as a whole can be very readily applied and secured to an ordinary wagon, and that when so in place the conveyer as a whole can be quickly and easily manipulated by the driver from his seat D so that all stalks within the range of movement of the conveyer can be acted upon for the purpose of severing the heads therefrom. In going to or from a field, or in traveling over sections of ground where the machine is not intended to be put in operation, the conveyer will normally be held substantially horizontal, as in Fig. 1, and with its base above the plane of the upper edge of the wagon body or box, and, of course, with the moving parts in the conveyer frame held out of action by the disengagement of the clutch members 60 and 61, such disengagement being maintained by the locking of the shifting lever 74 beneath the fixed lug 78, as before explained. When, however, the cutting operation is to commence the driver by a forward stroke of the hand-lever 26 (after it has been released from the segment 23ª) will cause the conveyer as a whole to rock downward upon its rear pivotal connection that is provided by the jointing together of the arms 21 and 23 that are carried by the conveyer base 19 and the bar 10 respectively. It will be observed that the pivots by which the shaft-connecting yokes 57 and 58 are secured to the block 59 are in horizontal alinement with the pivots 22 that the depending arms 21 bear upon and therefore the conveyer can be freely turned or rocked without in any manner affecting or interfering with the transmission of the driving power from the wagon-wheel to the movable elements carried by the conveyer frame. At any time during the progress of the wagon the conveyer as a whole can be swung laterally to carry its front end nearer to or farther away from the wagon-body in order to gather in and direct toward the cutting mechanism any leaning stalks, such lateral swinging being effected through the hand-lever 29, and the lateral movement being permitted by reason of the looseness of the joints between the arms 21 and 23 due to the width of the bifurcation at the ends of said arms 21 where they straddle their respective studs 22, as before explained. It is evident, therefore, that the driver by means of the two hand-levers 26 and 29 can at all times effect the rocking or turning of the conveyer up and down and toward and away from the wagon body with great ease and rapidity and hence insure almost perfect harvesting of the crop regardless of whether or not a large percentage of the stalks are considerably bent over to one side or the other. As the stalks approach the cutting mechanism they will be contacted by the moving arms 46 and 48 and forced between the cutting edge of the stationary knife 81 and the edge of one of the arms of the rotary knife 41, and after being severed the heads will be swept up the then inclined passageway of the conveyer by the arms of the two link belt members and the sweeps 49 of the lower link belt and will be carried around the curved rear end of such passageway and deposited in the wagon-box—the rear end of such passageway at all times overlying such box and thus insuring the deposit therein of all the harvested material. Inasmuch as many loose grains will become detached from the heads at the time of the severance of such heads from the stalks and also while the heads are being moved along the passageway the provision of the sweeps that run close to the surface of the base member 19 acts to prevent such loose grains and small detached pieces of the heads from being wasted.

It is desirable that some means be provided to relieve the operator as much as possible of the labor incident to raising the conveyer, and to that end I have provided a counterbalance in the form of a coiled spring 88, such spring being mounted on a tube 89 that is pivotally connected at its lower end to an end portion of the bracket 65 that is mounted on the bar 18. The tube projects through a slot in the conveyer base 19, the spring being interposed between such base and the member to which the tube is pivoted, whereby the spring will be compressed when the conveyer is lowered and will, therefore, of course aid in raising the conveyer.

What I claim as my invention and desire to secure by Letters Patent, is:—

1. In a harvesting machine of the class described, a conveyer comprising a frame provided with a longitudinal passage-way cutting mechanism at its forward end and means for moving harvested material through such passage-way, in combination with means for connecting said conveyer with a vehicle body to permit the conveyer to have a rocking movement in both vertical and horizontal planes, and means for transmitting power from the vehicle to the moving means in the conveyer frame when said conveyer is in any position.

2. The combination with a vehicle body, of a harvesting apparatus comprising a conveyer frame provided with a longitudinal passage-way and having cutting mechanism at its forward end and means for moving harvested material through such passage-way, a jointed support connecting said conveyer frame with said body adapted to permit said conveyer frame to be rocked in both vertical and horizontal planes, and means for transmitting power from the vehicle to the moving means in the conveyer frame while said conveyer is in any position.

3. The combination with a vehicle body, of a harvesting apparatus comprising a conveyer frame having cutting mechanism at its forward end and means for moving harvested material through the frame, a jointed support connecting said conveyer frame with said body adapted to permit said conveyer frame to be rocked in both vertical and horizontal planes, means for transmitting power from the vehicle to the moving means in the conveyer frame, said power-transmitting means comprising a sectional drive-shaft having a universal joint that is substantially in horizontal alinement with the joint in said conveyer frame support.

4. The combination with a vehicle body, of a harvesting apparatus comprising a conveyer frame provided with a longitudinal passage-way and having cutting mechanism at its forward end and means for moving harvested material through such passage-way, a jointed support connecting said conveyer frame with said body adapted to permit said conveyer frame to be rocked in both vertical and horizontal planes to different positions, means for controlling said movements, and means for transmitting power from the vehicle to the moving parts in the conveyer frame while said frame is in any of its several positions.

5. The combination with a vehicle body, of a harvesting apparatus comprising a conveyer frame having cutting mechanism at its forward end and means for moving harvested material through the frame, a jointed support connecting said conveyer frame with said body adapted to permit said conveyer frame to be rocked in both vertical and horizontal planes to different positions, separate means for controlling the movements in each of said directions, and means for transmitting power from the vehicle to the moving parts in the conveyer frame while said frame is in any of its several positions.

6. The combination with a vehicle body, of a harvesting apparatus comprising a conveyer frame having cutting mechanism at its forward end and means for moving harvested material through the frame, a jointed support connecting said conveyer frame with said body adapted to permit the conveyer to be given both vertical and lateral movements; a second support for the conveyer comprising a horizontally-swinging member connected with the wagon body and means pivotally connected with said member and with the conveyer frame for controlling the vertical movement of the conveyer, other means for controlling the lateral movements of the conveyer, and means for transmitting power from the vehicle to the moving parts in the conveyer frame while said frame is in any of its several positions.

7. The combination with a vehicle body, of a harvesting apparatus comprising a conveyer frame having cutting mechanism at its forward end and means for moving harvested material through the frame, a jointed support connecting said conveyer frame with said body adapted to permit the conveyer to be given both vertical and lateral movements; a second support for the conveyer comprising a horizontally-swinging segmental rack connected with the wagon body and lever mechanism pivotally connected with said rack and with the conveyer frame for controlling the vertical movements of the conveyer, other means for controlling the lateral movements of the conveyer, and means for transmitting power from the vehicle to the moving parts of the conveyer frame while said frame is in any of its several positions.

8. The combination with a vehicle body, of a harvesting apparatus comprising a conveyer frame having cutting mechanism at its forward end and means for moving harvested material through the frame, a jointed support connecting said conveyer frame with said body adapted to permit the conveyer to be given both vertical and lateral movements; a second support for the conveyer comprising a horizontally-swinging segmental rack connected with the wagon-body, a pivoted lever engaging the rack and a link pivotally connected with said lever and said conveyer whereby the vertical movements of the conveyer are controlled, other means for controlling the lateral movements of the conveyer, and means for transmitting power from the vehicle to the moving parts in the conveyer frame while said frame is in any of its several positions.

9. The combination with a vehicle body, of a harvesting apparatus comprising a conveyer frame having cutting mechanism at its forward end and means for moving harvested material through the frame, a jointed support for connecting said conveyer frame with said body adapted to permit the conveyer to be given both vertical and lateral movements; a second support for the conveyer comprising a horizontally-swinging member connected with the wagon body and means pivotally connected with said member and with the conveyer frame for controlling the vertical movements of the conveyer, a laterally-movable lever attached to said member for controlling its movements and through it the lateral shifting of the conveyer, and means for transmitting power from the vehicle to the moving parts of the conveyer frame while said frame is in any of its several positions.

10. The combination with a vehicle body, of a harvesting apparatus comprising a conveyer frame having cutting mechanism at its forward end and means for moving harvested material through the frame, a jointed support connecting said conveyer frame with said body adapted to permit the conveyer to be given both vertical and lateral movements; a second support for the conveyer comprising a horizontally-swinging segmental rack connected with the wagon body and lever mechanism pivotally connected with said rack and with the conveyer frame for controlling the vertical movements of the conveyer, a horizontally-swinging lever fixedly attached to said rack for controlling the lateral swinging of the rack and through it the lateral shifting of the conveyer, means for locking said last-named lever in any of its adjusted positions, and means for transmitting power from the vehicle to the moving parts in the conveyer frame while said frame is in any of its several positions.

11. The combination with a vehicle body, of a harvesting apparatus comprising a conveyer frame having cutting mechanism at its front end and means for moving harvested material through the frame, a jointed support for connecting said frame with said body, said support comprising an arm depending from said frame and bearing upon and loosely engaging a fixed stud supported from the wagon body, other means for supporting the conveyer and for raising and lowering its forward end and moving the same laterally, and means for transmitting power from the vehicle to the moving parts in the conveyer frame while said frame is in any position.

12. The combination with a vehicle body, of a harvesting apparatus comprising a conveyer frame having cutting mechanism at its front end and means for moving harvested material through the frame, a jointed support for connecting said frame with said body, said support comprising two arms spaced apart and depending from said frame and fixed studs supported from the wagon body upon which studs the said arms respectively bear and on which they are laterally movable, other means for supporting the conveyer and for raising and lowering its forward end and the same laterally, and means for transmitting power from the vehicle to the moving parts in the conveyer frame while said frame is in any position.

13. The combination with a vehicle body, of a harvesting apparatus comprising a conveyer frame having cutting mechanism at its front end and means for moving harvested material through the frame, of a jointed connection between the rear portion of said frame and the vehicle body for permitting the front end of the frame to be rocked thereon up and down and laterally, means for transmitting power from the vehicle to the moving means in the conveyer frame comprising a sectional drive-shaft having a universal joint that is in substantially horizontal alinement with the joint in said conveyer frame support, clutch members connected respectively with two sections of said drive-shaft and normally held in engagement with each other, and means for holding said members out of clutching engagement.

14. The combination with a vehicle body, of a harvesting apparatus comprising a conveyer frame having cutting mechanism at its front end and means for moving harvested material through the frame, of a supporting-frame attached to one side of the vehicle body and comprising a bar spaced at a distance from said side of the body, pivotally connected means extending respectively from said conveyer frame and said bar for movably supporting the rear portion of the conveyer, other means also pivotally connected with said bar for supporting the conveyer and controlling its movements, and means for transmitting power from the vehicle comprising a sectional drive-shaft journaled in bearings carried by said supporting-frame.

15. The combination with a vehicle body, of a harvesting apparatus comprising a conveyer frame having cutting mechanism at its front end and means for moving harvested material through the frame, of a jointed connection between the rear portion of said frame and the vehicle body adapted to permit the front end of the frame to be rocked thereon up and down and laterally, other means for supporting said conveyer from said vehicle body and for controlling its said movements, means for transmitting power from the vehicle to the moving parts in the conveyer, and means interposed between the conveyer and a fixed support for aiding in moving the conveyer upward.

16. The combination with a vehicle body, of a harvesting apparatus comprising a conveyer frame having cutting mechanism at its front end and means for moving harvested material through the frame, of a jointed connection between the rear portion of said frame and the vehicle body adapted to permit the front end of the frame to be rocked thereon up and down and laterally, other means for supporting said conveyer from said vehicle body and for controlling its said movements, means for transmitting power from the vehicle to the moving parts in the conveyer, and means interposed between the conveyer and a fixed support for aiding in moving the conveyer upward, said last-named means comprising a rod pivotally attached to such fixed support and loosely connected with said conveyer and a coiled spring surrounding such rod.

17. The combination with a vehicle body, of a harvesting apparatus comprising a conveyer frame having cutting mechanism at its front end and means for moving harvested material through the frame, of a jointed connection between the rear portion of said frame and the vehicle body adapted to permit the front end of the frame to be rocked thereon up and down and laterally, other means for supporting said conveyer from said vehicle body and for controlling its said movements, means for transmitting power from the vehicle to the moving parts in the conveyer, and means interposed between the conveyer and a fixed support for aiding in moving the conveyer upward, said last-named means comprising a rod pivotally attached at one end to one of said members and projecting through an opening in the other member and a coiled spring surrounding such rod.

18. In a harvesting apparatus of the class described the combination with a conveyer frame, means for pivotally supporting it from the side of a vehicle body to permit its forward end to be rocked up and down and also laterally, and means for controlling such movements, of a fixed cutter at the forward end of the conveyer and a rotatable cutter coöperating therewith, endless-belt forwarding means in the conveyer frame for moving the cut material away from the cutters, and means for transmitting power from the vehicle to said rotatable cutter and the forwarding means.

19. In a harvesting apparatus of the class described the combination with a conveyer frame, means for pivotally supporting it from the side of a vehicle body to permit its forward end to be rocked up and down and also laterally, and means for controlling such movements, of a fixed cutter at the forward end of the conveyer, a rotatable cutter coöperating therewith, a movable endless belt in said frame having projecting devices for engaging and moving the material, said projecting devices comprising a plurality of members adapted to sweep closely over the base of the conveyer frame, and means for transmitting power from the vehicle to said rotatable cutter and endless belt.

20. In a harvesting apparatus of the class described, the combination with a conveyer frame comprising a base, a side wall and a second wall spaced at a distance from said side wall to provide a longitudinal passageway through the frame and at one side thereof, of a fixed cutter at the front end of said passageway, a rotatable cutter coöperating with the fixed cutter, means for moving cut material along said passageway, means for transmitting power from the vehicle to said rotatable cutter and said moving means, and means for connecting said conveyer frame to a vehicle body to permit the front end of said frame to be rocked up and down and also laterally.

21. In a harvesting apparatus of the class described, the combination with a conveyer frame comprising a base, a side wall and a second wall spaced at a distance from said side wall to provide a longitudinal passageway through the frame and at one side thereof, the rear ends of the said two walls being curved, of a fixed cutter at the front end of said passageway, a rotatable cutter coöperating with the fixed cutter, means for moving cut material along said passageway, means for transmitting power from the vehicle to said rotatable cutter and the said moving means, and means for connecting said conveyer frame to a vehicle body to permit the front end of said frame to be rocked up and down and also laterally.

22. In a harvesting apparatus of the class described, the combination of a conveyer frame and means for pivotally attaching it to a vehicle body to permit its forward end to be moved up and down alongside of such body, said conveyer frame being provided with a longitudinal passage at one of its sides, cutting mechanism at the forward end of said passage, means movable through said passage for forcing the cut material through and out of the passage, and means for transmitting power from the vehicle to said cutting apparatus and movable means.

23. In a harvesting apparatus of the class described, the combination of a conveyer frame, and means for pivotally attaching it to a vehicle body to permit its forward end to be moved up and down alongside of such body, said conveyer frame being provided with a longitudinal passage at one of its sides, the rear end of the passage being turned toward the inner side of the said frame to direct material therefrom into such vehicle, cutting mechanism at the forward end of said passage, means movable through said passage for forcing the cut material through and out of the passage, and means for transmitting power from the vehicle to said cutting apparatus and movable means.

ROBERT R. BOWERS.